(No Model.)  3 Sheets—Sheet 1.
H. EDMUNDS.
DISTRIBUTION AND CONTROL OF ELECTRICITY FOR LIGHTING.
No. 390,463. Patented Oct. 2, 1888.
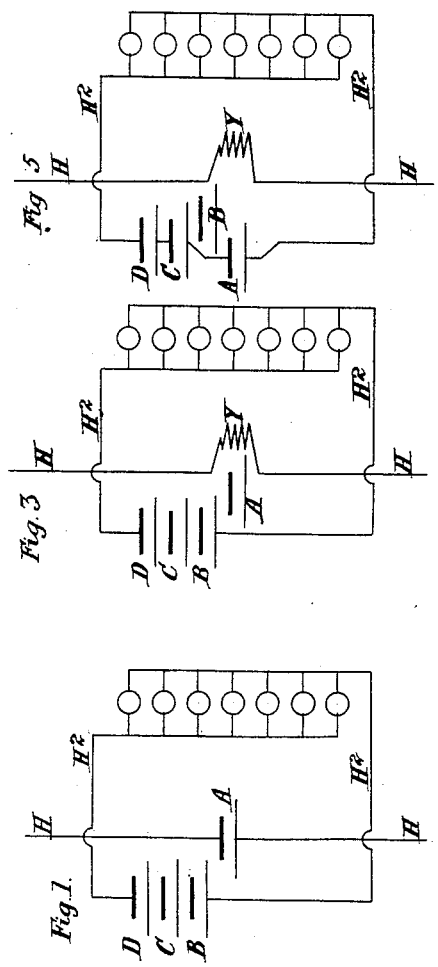
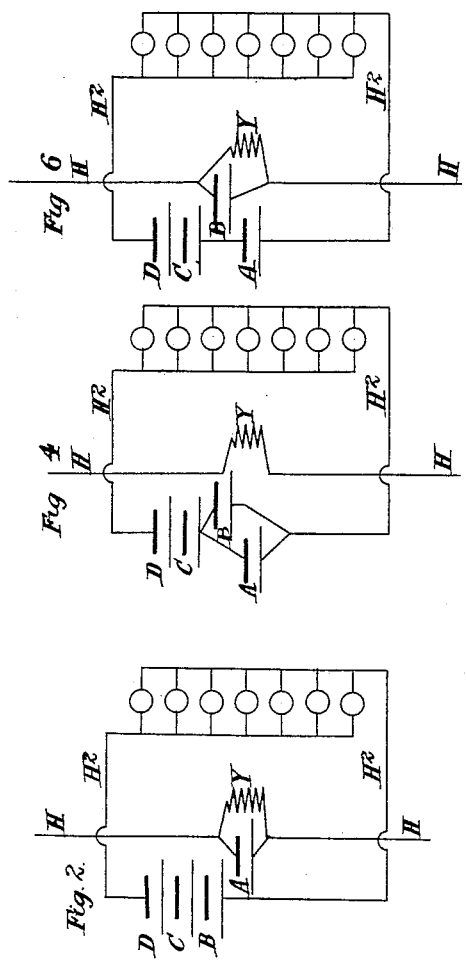

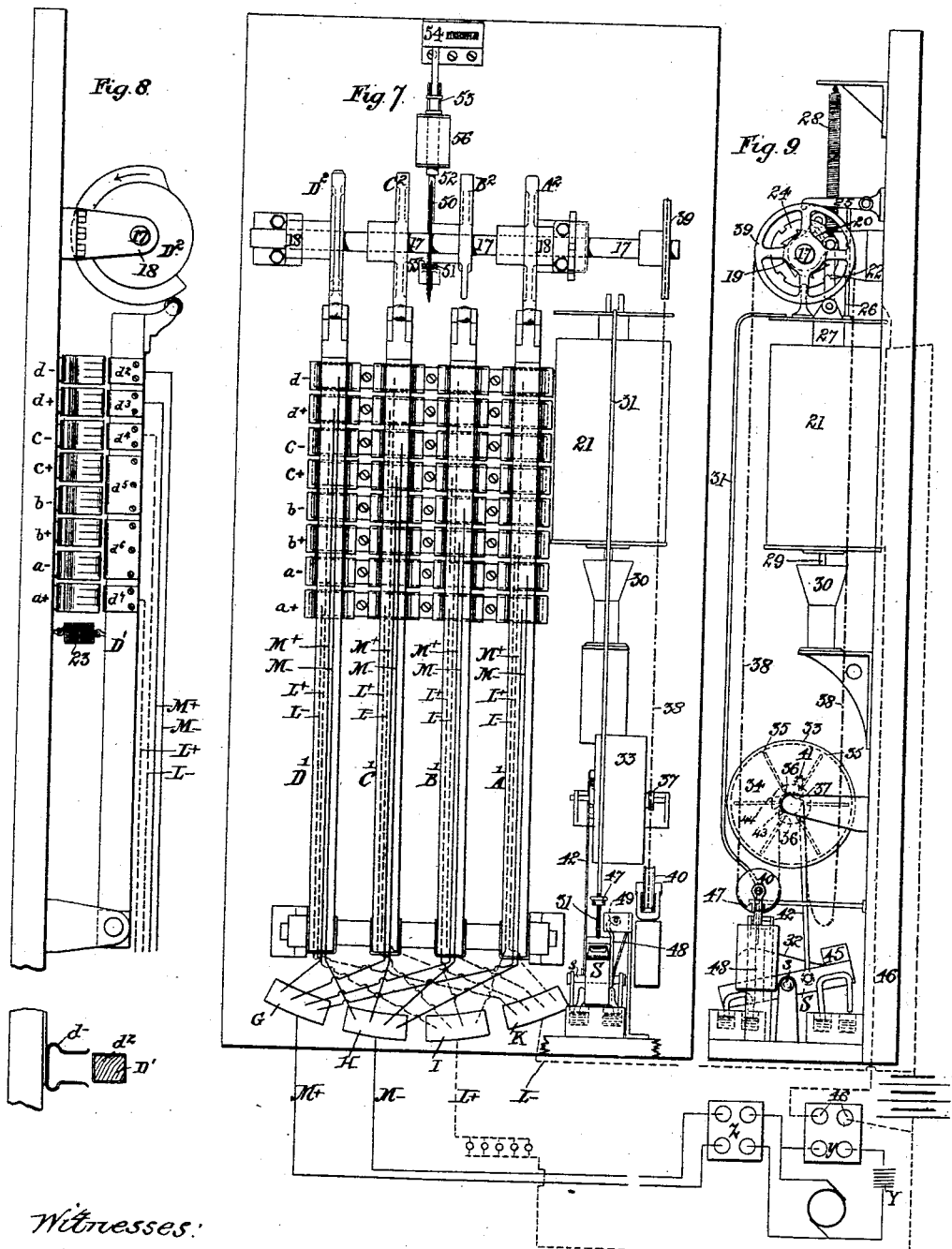

(No Model.) 3 Sheets—Sheet 3.
H. EDMUNDS.
DISTRIBUTION AND CONTROL OF ELECTRICITY FOR LIGHTING.
No. 390,463. Patented Oct. 2, 1888.
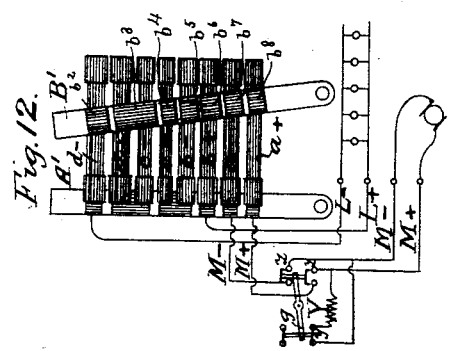
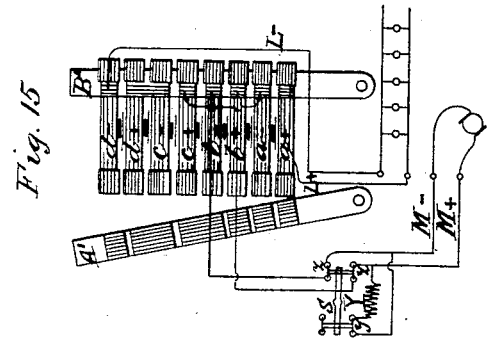
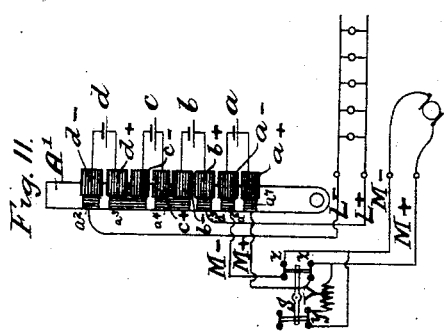
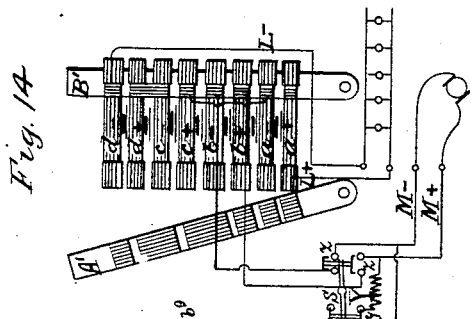
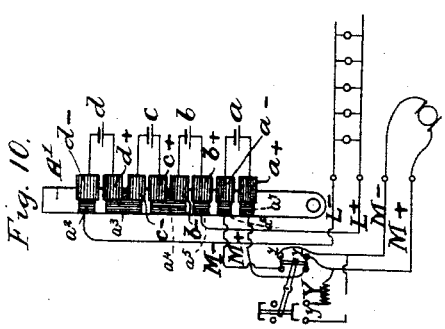
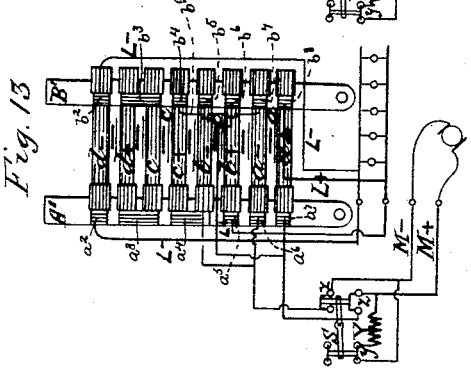

UNITED STATES PATENT OFFICE.

HENRY EDMUNDS, OF LONDON, ENGLAND.

DISTRIBUTION AND CONTROL OF ELECTRICITY FOR LIGHTING.

SPECIFICATION forming part of Letters Patent No. 390,463, dated October 2, 1888.

Application filed June 21, 1888. Serial No. 277,712. (No model.) Patented in England June 15, 1887, No. 8,641.

*To all whom it may concern:*

Be it known that I, HENRY EDMUNDS, a subject of the Queen of Great Britain, residing at 10 Hatton Garden, in the city of London, England, have invented a certain Improved System and Means to be Used in the Supply or Distribution and Control of Electricity for Lighting or other Purposes, (for which I have obtained a patent in Great Britain, No. 8,641, dated June 15, 1887,) of which the following is a specification.

This invention has reference more particularly to the utilization of secondary or storage batteries for electric lighting and similar purposes in installations which include a charging dynamo or dynamos at a central station and groups of batteries at sub-stations or localities where their energy is to be utilized, a charging-main, local or utilization circuits at each sub-station, and means whereby the batteries may be transferred from the main to the local circuit, and vice versa, for charging and discharging.

Heretofore and prior to my invention it has been common to provide at each station or point of use two sets of batteries, one of which may be receiving its charge in the main while the other is supplying the utilization-circuit, automatic switch mechanism being employed to transfer the sets of batteries from one circuit to the other. The object of such system is to maintain the supply of the utilization-circuit constant, there being always one set of batteries in condition to supply the required energy. It will be observed that the use of such system requires at each station twice the number of batteries actually required to supply the lamps or other translating devices. The power of the charging-dynamo must be sufficient to charge at once half of all the batteries used; in other words, to supply at all times an amount of energy somewhat in excess of the maximum energy used in the entire system. Excessive leakage and danger to life are necessary incidents of such system. Each set or group of batteries remains in the local circuit until practically exhausted, the potential of the circuit being greatest when a freshly-charged group of batteries is switched in and thereafter steadily falling as they discharge. This fluctuation causes inconveniences to the consumers, and the strain produced thereby upon the lamps militates against their longevity. It is obvious that as the minimum potential of the circuits must be sufficient to maintain the light (if it be a lighting system) the maximum potential will be greatly in excess. A waste of energy is therefore involved.

By the present invention the losses, dangers, and inconveniences above referred to are prevented, and other important practical advantages are secured, as hereinafter set forth. According to my invention the batteries at each station or point of utilization are divided into three or more sets or groups containing each the same number of cells. I find it convenient to use four groups at each station, and shall describe, for the sake of example, a system employing that number, though it is obvious that the invention is not limited thereto. These groups or sets are one by one for short and equal periods of time switched into the charging-main, so that there will always be one set in the charging-main, while three-fourths of all the batteries employed will be supplying the local or working circuit.

The system therefore calls for only two-thirds the number of batteries that would be required in the system above referred to, and as the batteries are perhaps the most costly part of such an installation this saving is of great importance. Proportionally less power and smaller generating plant are also required, since only one-fourth instead of half the total number of batteries is in the main or charging circuit. Besides the economy thus caused, there results the important advantage of smaller leakage, due to the lower pressure employed, and less danger to life. The batteries, moreover, are not charged to their maximum capacity and then completely discharged, but are maintained in nearly a uniform condition. For example, there being four sets of batteries and the period of inclusion of each set in the charging-circuit being fixed at two minutes, each battery will be withdrawn from the working circuit once in every eight minutes for a fresh charge. This is found to increase greatly the efficiency of the batteries and to retard deterioration. It also produces an important effect in the working-circuit, the pressure in which is, by means of this invention, kept practically uniform, whereby the longevity of the lamps is greatly increased. There being no fluctuation such as above referred to, in estimating the number of cells necessary to do the work of any particular station this consideration may be disregarded, and no margin of waste energy need be allowed to prevent the minimum potential falling below the limit required, as necessary heretofore.

If the batteries at the several stations are charged in series, it may be desirable to utilize the main or charging circuit for other work in addition to the charge of the batteries. The invention permits this to be done, since the charging-circuit is not interrupted nor its potential materially affected by the operations performed in carrying out this invention.

It is essential to the best working of such a system and to the attainment of all the advantages above pointed out that the charges of each set of batteries from the working to the charging circuit should be effected in such manner that, first, no portion of the battery is in connection with both circuits at the same time; second, the charging-circuit is never broken, and, third, the discharging-circuit is never interrupted, nor its pressure varied, nor any portion of the batteries short-circuited, even momentarily. To attain these objects I may arrange resistances (such as wire, electrolytic cells or motors, or reverse flow of current) to be put into the main circuit during the change of connections. I may effect the changes of circuits necessary in the operation of my system by means of a contact-maker moved at short intervals of time.

In order to preserve the continuity of the charging-circuit during the period which elapses between the disconnection of any one section and before the next section is included, the main is closed through a resistance or by-path, which has been previously connected in multiple arc with the section about to be removed, but which resistance is in turn removed after the next section of battery has been put in multiple with it in the said main or charging circuit. Similarly in the battery itself the section just charged is put in multiple with the section next about to be charged prior to the latter being removed from the battery, and being placed in the charging-main uniformity of pressure in the local battery being thus maintained and sudden fluctuation of its electro-motive force being prevented. As the four sections of any group are each included in the charging-main for equal periods, (but only one of the sections at any time being in the main, the other three being included in the local circuit,) it may be assumed that in a period of, say, twenty-four hours each section or fourth part receives the equivalent of six hours' charge—that is to say, that the four sections of any group receive a charge which enables a full discharge in the local circuit to be maintained for eight hours of that time by the three sections (three-fourths of a group) which are at any instant in the local. In the same way in the local circuit for any period of discharge—say eight hours—any one section is discharging for only three fourths of the eight hours, (six hours,) since it is periodically removed from the local circuit, and put into the charging-circuit for one-fourth of the eight hours, (two hours.)

While it is greatly preferred in carrying out the invention to arrange the batteries of each station in three or more groups, still it is obvious that the cycle of operations described could be applied to two groups or sets, and some of the advantages above stated thereby obtained—as, for instance, the freedom from fluctuation of the local circuit.

It will be understood that the invention is not limited to any particular apparatus, but may be carried out in many different ways. I have in fact devised and used a variety of apparatus for performing the operations necessary in the working of the system. In order, however, that the invention may be the better understood, I will describe the same in connection with the accompanying drawings, in which I have illustrated, by way of example, apparatus that may be employed in carrying the invention into effect.

Figures 1, 2, 3, 4, 5, and 6 are diagrams illustrating the nature and order of the operations performed in transferring the sections of such a battery from the local to the main, and vice versa, in the manner above described.

A, B, C, and D represent sections of a battery, each section consisting of any convenient number of cells.

In Fig. 1 section A is shown included in the charging-circuit H H, and sections B, C, and D included in the local or discharge circuit H². Before disconnecting the section A from the charging-circuit a resistance, Y, is put in parallel with it, as indicated in Fig. 2, the sections B, C, and D remaining in the local circuit, as before. The section A is now cut out of the charging-main, as indicated in Fig. 3, all the other conditions remaining as before. Section A is then inserted in the battery in parallel with section B, (which is next in turn for charging,) as indicated in Fig. 4, the other condition remaining as before. Section B is then taken out of the battery and left isolated, as indicated in Fig. 5, the other condition remaining as before. Section B is then put in parallel with the resistance Y in the charging-main, as indicated in Fig. 6, the other condition remaining as before. The said resistance is then removed, and the section B receives its charge, and a similar cycle to that already described with regard to section A is thus commenced. This process goes on, and each of the sections continues to receive in turn its increment of charge. These changes are effected by any suitable mechanism for changing the circuits as described, (applied to each group of storage-batteries.) For example, such mechanism may consist of a rotating cylinder or drum, on the periphery of which are contact-makers arranged to make connection between the charging-main and the sections of the group of secondary batteries and the resistance in the order described; or I may use an arrangement of commutator, such as is illustrated in Figs. 7 to 15, wherein cams driven by a suitably-timed motor and mechanism operate rocking-levers to insert contact-makers between contact-terminals belonging to each section of battery and to the main and local circuits in the order necessary for effecting the connection and disconnection of batteries, as described with reference to Figs. 1 to 6. I will now proceed to describe this arrangement with the aid of Figs. 7 to 15.

Fig. 7 is a front view of the apparatus. Fig. 8 is one side view, and Fig. 9 is the other side view. Figs. 10 to 15 show diagrammatically various positions of the moving parts during their cycle of operations.

As shown in the said figures, the positive and negative terminals of each battery are each connected to a separate contact-strip, which is fixed to the base-plate of the machine. On each copper strip are four spring-contacts, each arranged to make contact with contact-pieces on four vibrating levers, A' B' C' D'. The contact strips and spring contacts of battery $a$ are marked $a^+$ and $a^-$, respectively. Those of battery $b$ are marked $b^+$ and $b^-$, and so on. The four vibrating levers each carry branches from both the positive and the negative of the main and of the local conductors, and are operated by cams rotated by the shaft 17, the order of vibration of levers to give the changes illustrated by Figs. 1, 2, 3, 4, 5, and 6 is illustrated by the companion Figs. 10, 11, 12, 13, 14, and 15, wherein the positive and negative strip-terminals of the batteries A, B, C, and D are indicated by the letters $a^+ b^+ c^+ d^+$ and $a^- b^- c^- d^-$, respectively. The charging circuits, positive and negative, are indicated by $M^+$ and $M^-$, and the local positive and negative connections by $L^+$ and $L^-$.

In Figs. 7 and 8 the wires of the main circuit $M^+ M^-$ are indicated by full lines, and those of the local, $L^+ L^-$, by broken lines. The wire $M^+$ runs to a fixed contact-plate G, $M^-$ to contact-plate H, $L^+$ to contact-plate I, and $L^-$ to plate K. Each of these plates is connected by short wires, as shown, to each of the levers A' B' C' D'. These levers have each a series of contact-strips adapted to make contact with the spring-contacts of the several batteries. Fig. 8 shows the lever D' with its strips $d^2 d^3 d^4$, &c. On this lever the main-circuit wires $M^+ M^-$ are led to strips $d^3 d^2$, respectively, and the local wires $L^+ L^-$ to strips $d^7 d^4$, respectively. Some of the contact-strips, as $d^5$ and $d^6$, are long enough to connect two adjacent spring-contacts. Suppose, now, the section A be in the charging main, as in Fig. 1. Then lever A' will be in the position shown in Fig. 10—that is, in contact with the spring $a^+ a^-$, &c., of all the batteries. Battery $a$ is thus included in the main by wire $M^+$, strip $a^7$, spring $a^+$, battery $a$, spring $a^-$, strip $a^6$, and wire $M^-$. Wire $L^+$ runs to strip $a^3$ on lever A', and thence circuit is made through the batteries $b\ c\ d$, as clearly shown in the drawings. It is now desired to put a resistance in parallel in the main with the section A, as in Fig. 2. To effect this I employ a rocking lever and mercury-cups, as shown at S. (The mechanism by which the said rocking lever is operated is hereinafter described.) This rocking lever is caused to assume a horizontal position, as shown in Fig. 11, thus closing the circuit through the mercury-cups $y$, in which the resistance is included, which resistance is thus placed in parallel with the section A. (The resistance may be a solenoid or coil of a magnet energized when the current is diverted from the battery and caused to operate a device which may directly drive the contact-making mechanism, or may coil a spring, lift up a weight, or otherwise store energy which may afterward be usefully employed in driving the contact-making mechanism and time-keeper.) Now it is desired to cut the section A out of the main, the resistance alone remaining therein, as in Fig. 3. This is effected by causing the dipping lever S to assume the position shown in Fig. 12, so that the circuit through $y$, in which the resistance is included, remains closed, while the circuit from the main through the section A is broken at $z\ z$. The section B is next in turn for charging, and the lever B' will next be operated to put the section A in parallel with B in the local circuit, as in Fig. 4 and in Fig. 13 it will be seen that lever B' has been caused to make contact with its spring-contacts and the lever A' also maintains its position. The branches $L^+$ and $L^-$ of the local are led on lever B' to strips $b^3$ and $b^2$, respectively, while strips $b^4 b^5$ are connected by a short bridge-wire, $b^6$, which thus serves to connect the positive terminal of battery $c$ with the negative of battery $a$, the positive of the latter being connected in the local via spring $a^+$, strip $b^5$, and wire $L^+$; but the positive of battery $c$ is also connected with the negative of battery $b$ through strip $a^4$ on lever A', the positive of the battery being connected to local through $b^+ a^5 L^+$. Thus batteries $a$ and $b$ are in parallel in the local circuit in Fig. 4. On lever B' the branches $M^+ M^-$ of the main are attached, respectively, to strips $b^6 b^5$; but the branch of the main being broken at $z\ z$ only the resistance Y remains therein.

In Fig. 5 the section B is isolated. This is effected, as in Fig. 14 by withdrawing the lever A', which leaves the section A in the local circuit. The connection between the sections A and C is made by the bridge-wire on B', which has before been alluded to. The dipping lever S remains as in Fig. 12.

Fig. 6 shows the section B put in parallel with the resistance in the charging-main, and this result is arrived at by the dipping lever S assuming a horizontal position, (see Fig. 15,) when the main current flows to the batteries by way of $z\ z$, and also through the resistance Y by way of the mercury-cups $y$. The next operation consists in withdrawing the resistance from the main. This is effected by causing the dipping lever to assume the position shown in Fig. 10. The section B will then receive its charge and commence a similar cycle to that undergone by the section A, being also operated by the dipping lever S and by the levers B' and C' in a similar manner to that in which the levers A' and B' are operated with regard to section A, and from the preceding description the similar operations of charging the sections C and D will be readily understood. With this particular disposition of regulator-contacts, in order to insure that each section of the group of batteries shall receive equal charges it is evidently necessary that after having charged sections A, B, C, and D for equal periods of time, instead of going back immediately to C from D and charging it and A in the order named, and so on, whereby the groups D and A would only receive half the charge of their fellows, I cause D (or A) to remain for another period in connection with the charging-circuit, and thereby receive an equal charge. Thus it will be seen that the sections are connected with the charging-circuit in consecutive equal periods of time in the order indicated by the arrangement of letters following: A B C D, D C B A, A B C D, D C B A; and the battery which receives the last charge of one series of charges receives also the first charge of the following series, and therefore receives a charge during a period of double the ordinary duration. Hence in a period of twenty-four hours each battery receives equal increments of charge.

It now remains to describe the mechanism for driving the cams $A^2 B^2 C^2 D^2$, which actuate the levers, and the timing apparatus which insures that the cams shall be operated at certain regular intervals electrically.

A shaft, 17, is carried in bearings 18. Upon this shaft is secured a ratchet-wheel, 19. (See Fig. 9.) A pawl, 20, is connected by the link 22 to the armature 27 of the solenoid 21, which receives an energizing-current at certain regular intervals, which causes the descent of the armature 27, which rotates intermittently the shaft 17 and its cams $A^2 B^2 C^2 D^2$ through an eighth of a revolution, thus causing the levers A' B' C' D' to operate to open and close circuits in the manner described with reference to Figs. 11 to 15. One of the levers (D') and a set of contacts is shown in side elevation and section in Fig. 8, whence it will be seen that the contacts are made by rotating the cam $D^2$, so as to permit the spring 23 to pull the lever on which it acts into the contacts, the cam causing disconnection by forcing the said lever out from the contacts against the pull of the spring 23.

To insure that the cams shall not make more than an eighth of a revolution, owing to the inertia of parts, I provide a stop-wheel, 24, provided with a banking piece, 25, which is held up by the rod 26, attached to the armature 27 of the solenoid 21. Immediately after the armature has in descending commenced to rotate the shaft 17 the banking-piece 25 is lowered onto the periphery of the stop-wheel 24, and so soon as the eighth of a revolution is completed the banking-piece 25 drops into a recess in the said stop-wheel and prevents further rotation. The armature 27 of the solenoid is returned to its former position as soon as the current therein ceases by the spring 28. I provide a piston attached to the armature 27 by the rod 29 and working in a dash-pot, 30, to prevent too rapid a stroke of the armature.

The timing apparatus, which at regular intervals operates mechanism to send a current from the local circuit through the solenoid 21 to give a portion of a revolution to the shaft 17, consists of a closed drum, 33, divided radially into, say, six chambers by partitions 34. In each partition are two openings, each communicating with the adjacent chamber, one (35) near the inner circumference of the drum, and the other (36) at about the center of the drum. The function of these holes permits of a free circulation of the contents of the drum. Liquid is placed in the lower portion of the drum, and a small sprocket-wheel, 37, is attached to the drum, in which wheel lies an endless chain, 38. From this wheel the chain descends, forming a sling, in which lies a weighted pulley, 40. Thence it is carried round another and larger sprocket-wheel, 39, on the shaft 17, and the slack is carried down to such a level that it may have to ascend to the small sprocket-wheel 37, and thus have sufficient circumferential contact upon it.

The weighted pulley 40 rotates the drum 33 with the liquid within it until the moment of the liquid about the center on which the drum rotates is sufficient to balance the turning moment induced by the weight. Then the liquid gradually trickles through the holes 35, and by this redistribution of weight permits the weighted pulley 40 to fall slowly, and the drum to rotate slowly until the roller 41 on the end of rod 42 falls into a recess, 43, cut in a disk, 44, attached firmly to the said drum. The dipping lever S oscillates on a center, s, and is weighted at 45. The rod 42 is attached to this lever, and as soon as the roller 41 enters the recess 43 the weight 45 causes the lever S to assume a position opposite to that which is shown in Fig. 9, thereby breaking the circuit of the charging-main at $z$, (see description of Figs. 10 to 15,) introduces (by the mercury-cups $y$) a resistance as an alternative path for the main, and by the cups 46 closes a shunt from the local or charging circuit through the solenoid 21, operating the cam-shaft 17, as hereinbefore described. On the descent of this armature 27 the rod 31 comes into contact with the spring 32 and compresses it without operating the lever S, which is upheld by a spring-detent, 48, and by the time that the rod 31 reaches a certain point the collar 47, by coming into contact with the curved surface 49, forces out the detent 48 and permits the oscillating lever S to return to the position indicated in Fig. 9, cutting at 46 the shunt from the local circuit through the solenoid 21, (and permitting the spring 28 to return the armature 27, as hereinbefore described,) and also cutting out the resistance by breaking the circuit at $y$ and remaking the main circuit through $z$.

In Fig. 7 is represented a solenoid, 56, whose armature 52 is connected with a spindle, 50, carrying a pinion, 51. It also connects with the shaft 53, operating an ordinary counter, 54. Solenoid 56 is in a branch of the main, and when the full current is flowing therein it raises the armature 52, bringing pinion 51 in contact with a worm-wheel on shaft 17. Consequently every turn of said shaft is registered on the counter, giving the supplying company a record of the power supplied the station. When the current is diverted from the station, or if the company is not supplying the full strength of current, the armature falls and pinion 51 is arrested by stop 55. A fuller description of this device is given in my application, Serial No. 280,019, filed July 16, 1888, to which reference may also be had for a fuller description of the operation of the apparatus, whereby the circuit changes, as hereinbefore set forth, are effected.

Having now fully described my said invention and the manner in which the same is or may be carried into effect, I would observe, in conclusion, that I do not herein claim or restrict myself to the particular apparatus hereinbefore described, as the said apparatus forms no necessary part of this invention, and is, moreover, claimed in other applications for patent; but

What I do claim herein, and desire to secure by Letters Patent, is—

1. The method of utilizing secondary or storage batteries in installations for electric lighting or other purposes, employing a main or charging circuit and local or working circuits at different stations, said method consisting in arranging the batteries at each station in groups or sets and transferring each group or set in turn from the working-circuit into the charging circuit for short periods of time without short-circuiting the batteries or breaking the charging or working circuits, so that all but one of the groups or sets are in the working-circuit at any instant of time, substantially as described.

2. In an installation or system employing secondary batteries, a charging-circuit, and local or discharging circuits at each station, the method of charging and discharging said batteries by arranging them in equal groups or sets having separate terminals, transferring a group or set to the charging-main for a short period of time, then connecting a resistance in a parallel branch of the charging-main, disconnecting the group or set of batteries from the main and connecting it in a branch of the working-circuit in multiple arc with another group or set of batteries, disconnecting the latter from the working-circuit and connecting it in the branch of the charging-circuit in multiple arc with said resistance, disconnecting the resistance so that the entire charging-current passes through said batteries, and performing the same operation with each group or set of batteries in rotation at short and regular intervals of time, substantially in the manner and for the purposes set forth.

In testimony whereof I have signed my name to this specification in the presence of two subscribing witnesses.

HENRY EDMUNDS.

Witnesses:
 CHAS. MILLS,
 R. A. LAWRENCE,
*Both of 47 Lincoln's Inn Fields, London.*